(12) United States Patent
Yagasaki

(10) Patent No.: US 10,309,532 B2
(45) Date of Patent: Jun. 4, 2019

(54) TRANSMISSION CONTROL METHOD OF BELT TYPE CONTINUOUSLY VARIABLE TRANSMISSION

(71) Applicant: Honda Motor Co.,Ltd., Tokyo (JP)

(72) Inventor: Toru Yagasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/807,573

(22) Filed: Nov. 9, 2017

(65) Prior Publication Data

US 2018/0163864 A1 Jun. 14, 2018

(30) Foreign Application Priority Data

Dec. 9, 2016 (JP) ................ 2016-239003

(51) Int. Cl.
| | |
|---|---|
| *F16H 61/662* | (2006.01) |
| *F16H 9/14* | (2006.01) |
| *F16H 61/02* | (2006.01) |
| *F16H 9/18* | (2006.01) |
| *F16H 59/70* | (2006.01) |
| *F16H 59/14* | (2006.01) |

(52) U.S. Cl.
CPC ......... *F16H 61/66272* (2013.01); *F16H 9/14* (2013.01); *F16H 9/18* (2013.01); *F16H 61/02* (2013.01); *F16H 61/662* (2013.01); *F16H 59/70* (2013.01); *F16H 2059/147* (2013.01); *F16H 2059/148* (2013.01); *F16H 2059/704* (2013.01); *F16H 2061/66277* (2013.01)

(58) Field of Classification Search
CPC ............. F16H 61/662; F16H 61/66272; F16H 2061/66277; F16H 9/14; F16H 9/18; F16H 59/70; F16H 2059/147; F16H 2059/148; F16H 2059/704
See application file for complete search history.

(56) References Cited

U.S. PATENT DOCUMENTS

| | | | | |
|---|---|---|---|---|
| 5,964,818 | A | * 10/1999 | Kanehara | F16H 61/66272 474/8 |
| 2002/0155910 | A1 | * 10/2002 | Nishizawa | F16H 61/66254 474/69 |

(Continued)

FOREIGN PATENT DOCUMENTS

| | | |
|---|---|---|
| JP | 2010-065824 | 3/2010 |
| JP | 5689973 | 3/2015 |

*Primary Examiner* — Huan Le
(74) *Attorney, Agent, or Firm* — JCIPRNET

(57) ABSTRACT

In a first process, a tangential friction coefficient of a non-slippage side pulley of a drive pulley and a driven pulley is estimated from a tangential friction coefficient and a winding diameter of a slippage side pulley. In a second process, torque transmitted by a metal belt is calculated from the tangential friction coefficient and the winding diameter. In a third process, a required axial thrust of the non-slippage side pulley is calculated from the torque and the winding diameter. In a fourth process, the gear ratio is changed by reducing a ratio holding axial thrust of the non-slippage side pulley toward the required axial thrust. Therefore, the gear shifting can be performed merely by reducing the axial thrust of the non-slippage side pulley, and thus it is possible to improve the durability of the pulleys or the metal belt and to reduce a load of a hydraulic pump.

2 Claims, 6 Drawing Sheets

(56) References Cited

U.S. PATENT DOCUMENTS

2014/0032066 A1* 1/2014 Kanehara ................ F16H 9/125
  701/60
2015/0088388 A1* 3/2015 Kanehara .......... F16H 61/66272
  701/51

* cited by examiner

TRANSMISSION CONTROL METHOD OF BELT TYPE CONTINUOUSLY VARIABLE TRANSMISSION

CROSS-REFERENCE TO RELATED APPLICATION

This application claims the priority benefit of Japan application serial no. 2016-239003, filed on Dec. 9, 2016. The entirety of the above-mentioned patent application is hereby incorporated by reference herein and made a part of this specification.

BACKGROUND OF THE INVENTION

Field of the Invention

The present invention relates to a transmission control method of a belt type continuously variable transmission in which a metal belt is wound around a drive pulley and a driven pulley and a gear ratio is changed by changing axial thrusts of the drive pulley and the driven pulley.

Description of Related Art

According to the following Patent Document 1, slippage easily occurs between a radially inner portion of a pulley V surface of a belt type continuously variable transmission from a predetermined position and a metal belt, but a large friction coefficient can be secured by making a shape of a generatrix of the radially inner portion of the pulley V surface into a straight line, and thus slippage is prevented, and the metal belt can also be smoothly engaged with the V surface by making a shape of a generatrix of a radially outer portion thereof into a curved line curving in a direction to ensure misalignment of the metal belt, and thus durability of the pulley or the metal belt is enhanced.

Further, according to the following Patent Document 2, slippage of the metal belt is detected by making shapes of some of metal elements forming the metal belt of the belt type continuously variable transmission different from shapes of other metal elements and then detecting the metal elements having the different shapes using a gap sensor provided adjacent to the metal belt.

PRIOR ART DOCUMENT

Patent Documents

[Patent Document 1] Japanese Patent No. 5689973
[Patent Document 2] Japanese Unexamined Patent Application Publication No. 2010-065824

SUMMARY OF THE INVENTION

However, in Patent Document 1, there is disclosed a case in which the friction coefficient between the pulley V surface and the metal belt is reduced when a shape of a generatrix of the pulley V surface is curved but slippage is unlikely to occur at the radially outer portion of the pulley V surface even though the friction coefficient is reduced. However, if the friction coefficient of the radially outer portion of the pulley V surface can be checked, for example, it is not necessary to increase the axial thrust of the drive pulley when gears are shifted from a LOW ratio toward an OD ratio when a vehicle starts, and it is only necessary to reduce the axial thrust of the driven pulley. Accordingly, by reducing a maximum hydraulic pressure required to generate the axial thrust on the pulley, the durability of the pulley or the metal belt can be enhanced and a load of a hydraulic pump can be reduced.

Further, the technique disclosed in Patent Document 2 is effective as a technique for detecting a rotational direction of the metal belt with a high precision when slippage occurs but cannot be used as a technique for measuring the friction coefficient of the radially outer portion of the pulley V surface.

The present invention has been made in view of the above-described circumstances, and it is an object of the present invention to enable gear shifting while an axial thrust of a pulley is minimized.

To achieve the object, according to the invention disclosed in a first aspect, there is provided a transmission control method of a belt type continuously variable transmission in which a metal belt is wound on a drive pulley and a driven pulley and a gear ratio is changed by changing axial thrusts of the drive pulley and the driven pulley, the method including a first process of estimating a relationship between a tangential friction coefficient and a ratio of a non-slippage side pulley of the drive pulley and the driven pulley from a relationship between a tangential friction coefficient and a ratio of a slippage side pulley, a second process of calculating transmission torque transmitted by the metal belt from the tangential friction coefficient and a winding diameter of the slippage side pulley, a third process of calculating a required axial thrust for suppressing slippage of the non-slippage side pulley from the transmission torque and the winding diameter of the non-slippage side pulley, and a fourth process of changing the gear ratio by reducing a ratio holding axial thrust of the non-slippage side pulley toward the required axial thrust.

Further, according to the invention disclosed in a second aspect, in addition to the constitution of the first aspect, a transmission control method of a belt type continuously variable transmission in which, in a region in which the ratio is a predetermined value or more, reduction control of the axial thrust may be performed in the driven pulley, and in a region in which the ratio is less than the predetermined value, the reduction control of the axial thrust may be performed in the drive pulley, is proposed.

According to the constitution of the first aspect, in the first process, the relationship between the tangential friction coefficient and the ratio of the non-slippage side pulley of the drive pulley and the driven pulley is estimated from the relationship between the tangential friction coefficient and the ratio of the slippage side pulley, in the second process, the transmission torque transmitted by the metal belt is calculated from the tangential friction coefficient and the winding diameter of the slippage side pulley, in the third process, the required axial thrust for suppressing slippage of the non-slippage side pulley is calculated from the transmission torque and the winding diameter of the non-slippage side pulley, and in the fourth process, the gear ratio is changed by reducing the ratio holding axial thrust of the non-slippage side pulley toward the required axial thrust. Therefore, the gear shifting can be performed merely by reducing the axial thrust of the non-slippage pulley without performing the conventional control of increasing the axial thrust of the slippage pulley and performing the gear shifting, and thus it is possible to improve the durability of the pulleys or the metal belt and to reduce a load of a hydraulic pump.

Further, according to the constitution of a second aspect, in the region in which the ratio is the predetermined value or more, the reduction control of the axial thrust is performed in the driven pulley, and in the region in which the ratio is less than the predetermined value, the reduction control of the axial thrust is performed in the drive pulley. Therefore, the gear shifting is enabled in the entire ratio region while the control of the axial thrust is simplified.

DESCRIPTION OF THE EMBODIMENTS

Hereinafter, an embodiment of the present invention will be described on the basis of FIGS. 1 to 6.

Figure 1:
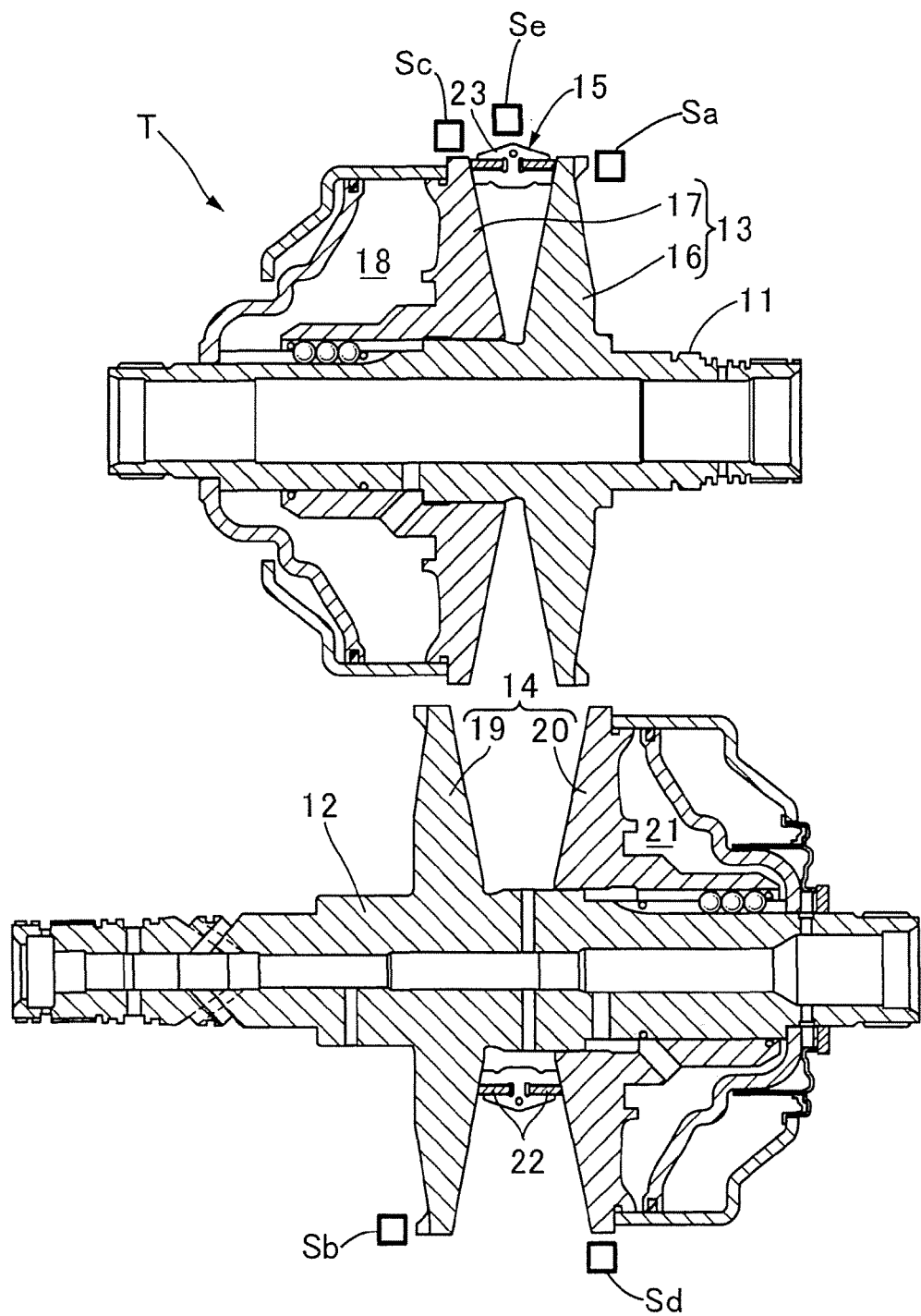
FIG. 1 is a diagram illustrating an overall constitution of a belt type continuously variable transmission.

FIG. 1 illustrates a schematic constitution of a belt type continuously variable transmission T installed in an automobile, in which the belt type continuously variable transmission T includes a drive shaft 11 which is connected to an engine and a driven shaft 12 which is connected to drive wheels, and an endless metal belt 15 is wound on a drive pulley 13 provided on the drive shaft 11 and a driven pulley 14 provided on the driven shaft 12. The drive pulley 13 includes a fixed side pulley half 16 which is fixed to the drive shaft 11 and a movable side pulley half 17 which is capable of coming in contact with and being separated from the fixed side pulley half 16, and the movable side pulley half 17 is biased toward the fixed side pulley half 16 by a hydraulic pressure acting on an oil chamber 18. The driven pulley 14 includes a fixed side pulley half 19 which is fixed to the driven shaft 12 and a movable side pulley half 20 which is capable of coming in contact with and being separated from the fixed side pulley half 19, and the movable side pulley half 20 is biased toward the fixed side pulley half 19 by a hydraulic pressure acting on an oil chamber 21. The metal belt 15 is constituted of a plurality of metal elements 23 supported on a pair of metal rings 22 and 22.

A rotational speed of the drive pulley 13 is detected by a drive pulley rotational speed sensor Sa, a rotational speed of the driven pulley 14 is detected by a driven pulley rotational speed sensor Sb, a stroke (that is, a groove width of the drive pulley 13) of the movable side pulley half 17 of the drive pulley 13 is detected by a drive pulley stroke sensor Sc, a stroke (that is, a groove width of the driven pulley 14) of the movable side pulley half 20 of the driven pulley 14 is detected by a driven pulley stroke sensor Sd, and a circumferential speed of the metal belt 15 is detected by a metal belt circumferential speed sensor Se.

Figure 2:
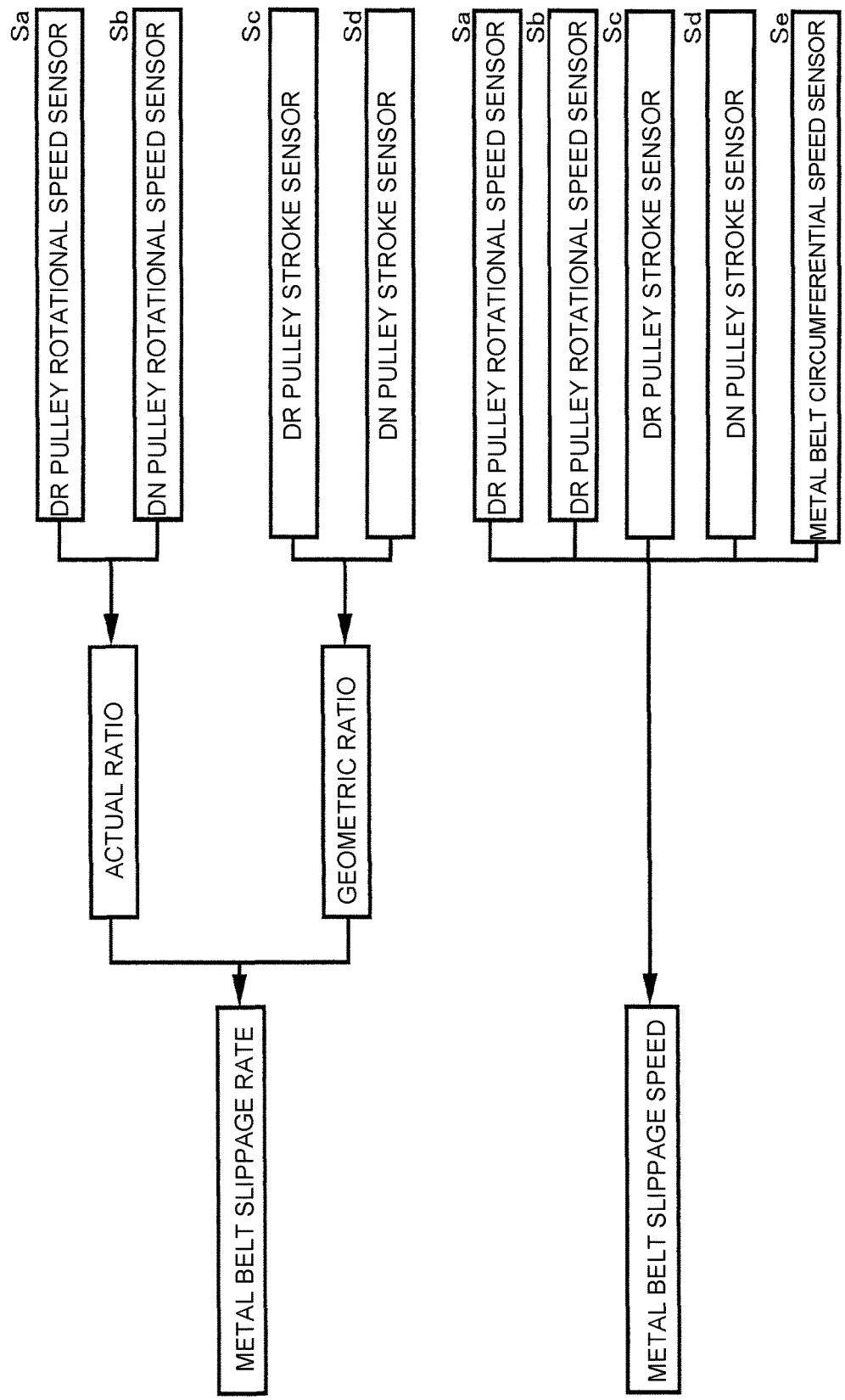
FIG. 2 is an explanatory view of a method of detecting a slippage ratio and a slippage direction of a metal belt.

As illustrated in FIG. 2, an actual ratio between the drive pulley 13 and the driven pulley 14 is calculated from the rotational speed of the drive pulley 13 detected by the drive pulley rotational speed sensor Sa and the rotational speed of the driven pulley 14 detected by the driven pulley rotational speed sensor Sb, and a geometric ratio between the drive pulley 13 and the driven pulley 14 is calculated from the stroke of the drive pulley 13 detected by the drive pulley stroke sensor Sc and the stroke of the driven pulley 14 detected by the driven pulley stroke sensor Sd.

The actual ratio is a real ratio between the drive pulley 13 and the driven pulley 14 and is changed by slippage between the drive pulley 13 and the metal belt 15 or slippage between the driven pulley 14 and the metal belt 15. Meanwhile, the geometric ratio is uniquely determined by the groove widths of the drive pulley 13 and the driven pulley 14 and corresponds to the actual ratio when slippage does not occur.

Further, since the circumferential speed of the drive pulley 13 at a winding position of the metal belt 15 can be known from the drive pulley rotational speed detected by the drive pulley rotational speed sensor Sa and the stroke of the drive pulley 13 detected by the drive pulley stroke sensor Sc, a slippage ratio and a direction of the slippage of the metal belt 15 in the drive pulley 13 can be calculated by comparing the circumferential speed of the drive pulley 13 with the circumferential speed of the metal belt 15 detected by the metal belt circumferential speed sensor Se. Similarly, since the circumferential speed of the driven pulley 14 at the winding position of the metal belt 15 can be known from the driven pulley rotational speed detected by the driven pulley rotational speed sensor Sb and the stroke of the driven pulley 14 detected by the driven pulley stroke sensor Sd, a slippage ratio and a direction of the slippage of the metal belt 15 in the driven pulley 14 can be calculated by comparing the circumferential speed of the driven pulley 14 with the circumferential speed of the metal belt 15 detected by the metal belt circumferential speed sensor Se.

A frictional force is generated between the fixed side pulley halves 16 and 19 and the metal belt 15 and between the movable side pulley halves 17 and 20 and the metal belt 15 by a load (axial thrust) which hydraulically presses the movable side pulley halves 17 and 20 against the fixed side pulley halves 16 and 19 of the pulleys 13 and 14, and slippage of the metal belt 15 is prevented by the frictional force. When a transmission torque is increased in a state in which a driving force is transmitted while the metal belt 15 is interposed between the fixed side pulley halves 16 and 19 and the movable side pulley halves 17 and 20 with a predetermined axial thrust, the metal belt 15 cannot endure it and slips eventually. At this time, it is important to know a tangential friction coefficient between the pulleys 13 and 14 and the metal belt 15 to control the ratio while preventing slippage of the metal belt 15.

The transmission torque of the pulleys 13 and 14 is given by the product of a tangential frictional force acting between the pulleys 13 and 14 and the metal belt 15 and a winding diameter of the metal belt 15, and the tangential frictional force is given by the product of the axial thrust of the pulleys 13 and 14 and the tangential friction coefficient. Additionally, the winding diameter of the metal belt 15 can be known from an output of the drive pulley stroke sensor Sc or the driven pulley stroke sensor Sd, the axial thrust of the pulleys 13 and 14 can be known from the hydraulic pressure which urges the movable side pulley halves 17 and 20 toward the fixed side pulley halves 16 and 19, and a moment at which the metal belt 15 slips can be known by comparing the circumferential speeds of the pulleys 13 and 14 and the circumferential speed of the metal belt 15. Therefore, the tangential friction coefficient which becomes maximum at the moment at which the metal belt 15 slips can be calculated at an arbitrary ratio.

Figure 3:
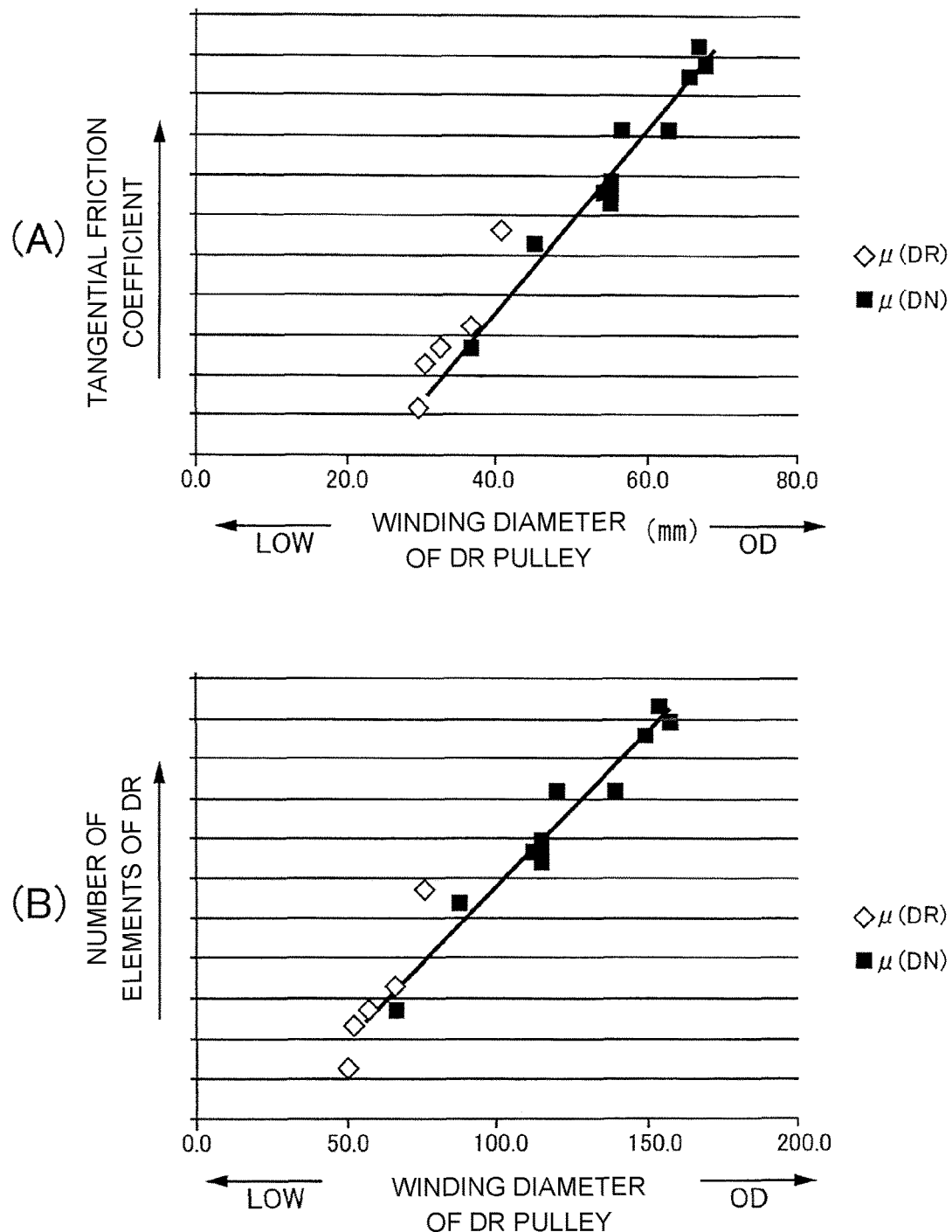
FIG. 3 is a graph illustrating a relationship between a winding diameter of a pulley or the number of metal elements in contact with the pulley and a tangential friction coefficient.

(A) of FIG. 3 illustrates the tangential friction coefficient between the pulleys 13 and 14 and the metal belt 15 which is calculated by the above-described method and arranged according to the winding diameter of the metal belt 15 in the drive pulley 13, and (B) of FIG. 3 illustrates the tangential friction coefficient between the pulleys 13 and 14 and the metal belt 15 which is calculated in the same manner and arranged according to the number of the metal elements 23 of the metal belt 15 in contact with the drive pulley 13. In a region in which the ratio is close to LOW, that is, a region in which the winding diameter of the metal belt 15 is small on the drive pulley 13 side or a region in which the number of the metal elements 23 in contact with the driven pulley 13 is small, data on the tangential friction coefficient on the drive pulley 13 side in which the metal belt 15 slips is obtained, and conversely, in a region in which the ratio is close to OD, that is, a region in which the winding diameter of the metal belt 15 is small on the driven pulley 14 side or a region in which the number of the metal elements 23 in contact with the driven pulley 14 is small, data on the tangential friction coefficient on the driven pulley 14 side in which the metal belt 15 slips is obtained.

As apparent from the graphs, the tangential friction coefficient increases linearly according to an increase in the winding diameter of the metal belt 15 or an increase in the number of metal elements 23 in contact with the pulleys 13 and 14, and a property thereof is common to the drive pulley 13 and the driven pulley 14. The tangential friction coefficient at radially outer portions of the pulleys 13 and 14 which could not be measured conventionally because slippage hardly occurred, that is, the tangential friction coefficient on the driven pulley 14 side in the range in which the ratio is close to the LOW and the tangential friction coefficient of the drive pulley 13 side in the region in which the ratio is close to the OD, can be precisely estimated using the relationship in which the tangential friction coefficient between the pulleys 13 and 14 and the metal belt 15 increases linearly according to the increase in the winding diameter, as described above.

Conventionally, in the region in which the ratio is close to the LOW, the tangential friction coefficient of the drive pulley 13 could be measured, but the tangential friction coefficient of the driven pulley 14 could not be measured. Therefore, when the ratio was changed to the OD side by reducing the groove width of the drive pulley 13 and increasing the groove width of the driven pulley 14, it was necessary to reduce the groove width by increasing the axial thrust of the drive pulley 13. This is because it is impossible to know the tangential friction coefficient of the driven pulley 14 side and thus there is a possibility that the driven pulley 14 and the metal belt 15 will slip when it is intended to shift to the OD side by reducing the axial thrust on the driven pulley 14 side.

Similarly, in the region in which the ratio is close to the OD, the tangential friction coefficient of the driven pulley 14 could be measured, but the tangential friction coefficient of the drive pulley 13 could not be measured. Therefore, when the ratio was changed to the LOW side by reducing the groove width of the driven pulley 14 and increasing the groove width of the drive pulley 13, it was necessary to reduce the groove width by increasing the axial thrust of the driven pulley 14. This is because it is impossible to know the tangential friction coefficient of the drive pulley 13 side and thus there is a possibility that the drive pulley 13 and the metal belt 15 will slip when it is intended to shift to the LOW side by reducing the axial thrust on the drive pulley 13 side.

On the other hand, in the embodiment, since the tangential friction coefficient of the driven pulley 14 side can be estimated when the ratio is changed from the LOW side to the OD, the ratio can be changed to the OD side by not increasing the axial thrust on the drive pulley 13 side but reducing the axial thrust on the driven pulley 14 side within a range in which slippage of the metal belt 15 does not occur on the driven pulley 14 side.

In addition, since the tangential friction coefficient of the drive pulley 13 side can be estimated when the ratio is changed from the OD side to the LOW side, the ratio can be changed to the LOW side by not increasing the axial thrust on the driven pulley 14 side but reducing the axial thrust on the drive pulley 13 side within a range in which slippage of the metal belt 15 does not occur on the drive pulley 13 side.

As described above, according to the embodiment, since the gear shifting can be performed while slippage of the metal belt 15 is suppressed by not increasing but reducing the axial thrust of the pulleys 13 and 14, a load applied to the pulleys 13 and 14 and the metal belt 15 due to the axial thrust is reduced, and thus durability of the belt type continuously variable transmission T can be increased and a load of the hydraulic pump which generates the hydraulic pressure for gear shifting can be reduced.

Figure 4:
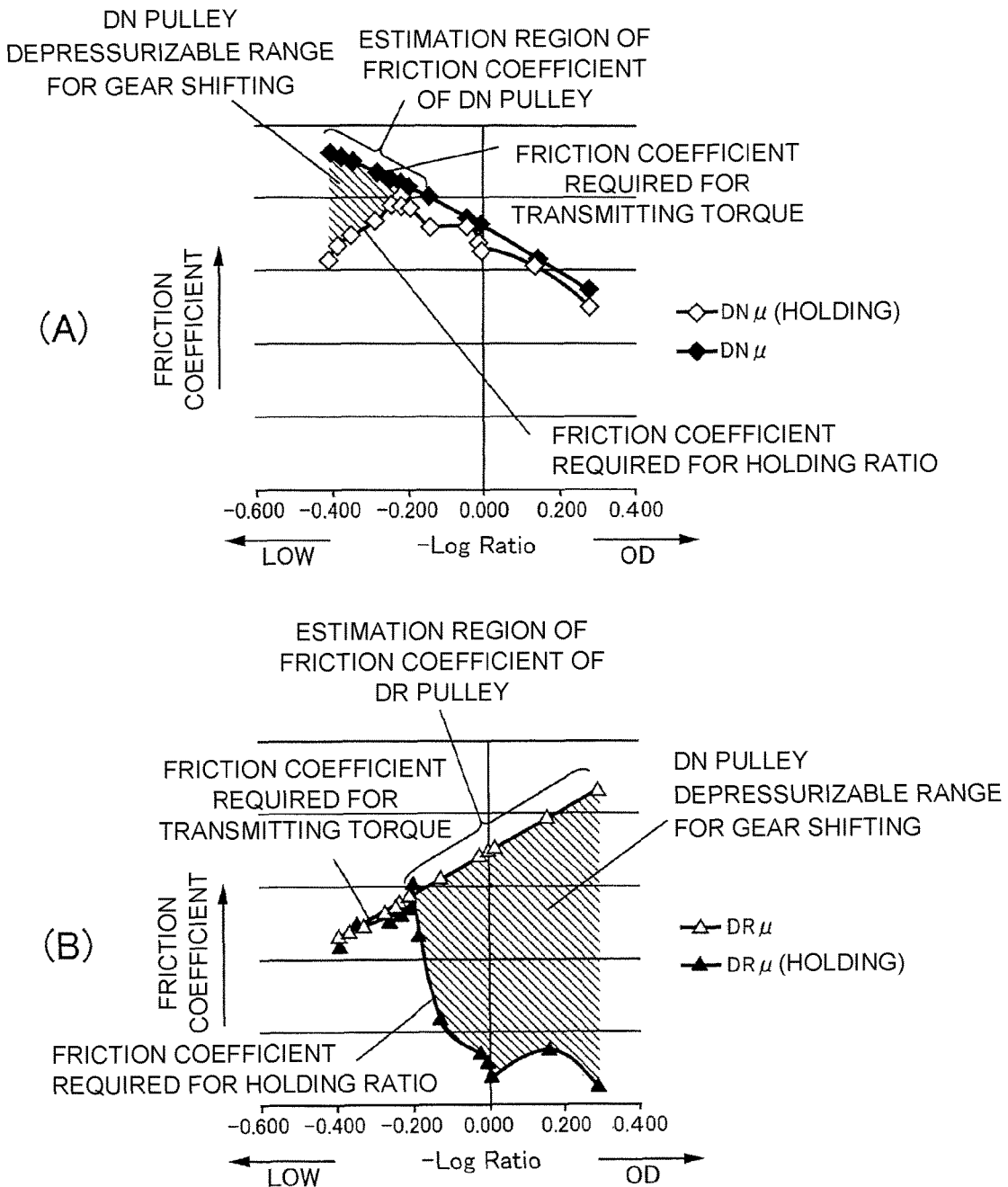
FIG. 4 is a graph illustrating a ratio region which can be gear-shifted by reducing an axial thrust of the pulley.

A graph of (A) of FIG. 4 illustrates the tangential friction coefficient of the driven pulley 14 required for torque transmission and the tangential friction coefficient of the driven pulley 14 required for holding the ratio with respect to the ratio (−log value). Conventionally, since it was impossible to measure the tangential friction coefficient of the driven pulley 14 side having a large winding diameter in the region in which the ratio is on the LOW side, the axial thrust at which the tangential friction coefficient required for the torque transmission could be obtained was provided. However, in the transmission control, since it is sufficient to provide only the tangential friction coefficient required for holding the ratio to the driven pulley 14 side, the axial thrust (refer to a shaded portion) corresponding to a difference between the tangential friction coefficient required for torque transmission and the tangential friction coefficient required for holding the ratio is unnecessarily added.

According to the embodiment, it is possible to estimate the tangential friction coefficient on the driven pulley 14 side having a large winding diameter in the region in which the ratio is on the LOW side. Accordingly, since it is ensured that no slippage will occur if, instead of the axial thrust at which the tangential friction coefficient required for torque transmission can be obtained, the tangential friction coefficient required for holding the ratio on the driven pulley 14 side which is smaller than that is applied, it is possible to reduce the axial thrust of the driven pulley 14 corresponding to the tangential friction coefficient of the shaded portion in (A) of FIG. 4.

Similarly, in a graph of (B) of FIG. 4, according to the embodiment, it is possible to estimate the tangential friction coefficient on the drive pulley 13 side having a large winding diameter in the region in which the ratio is on the OD side. Accordingly, since it is ensured that no slippage will occur if, instead of the axial thrust at which the tangential friction coefficient required for torque transmission can be obtained, the tangential friction coefficient required for holding the ratio on the drive pulley 13 side which is smaller than that is applied, it is possible to reduce the axial thrust of the drive pulley 13 corresponding to the tangential friction coefficient of the shaded portion in (B) of FIG. 4.

Figure 5:
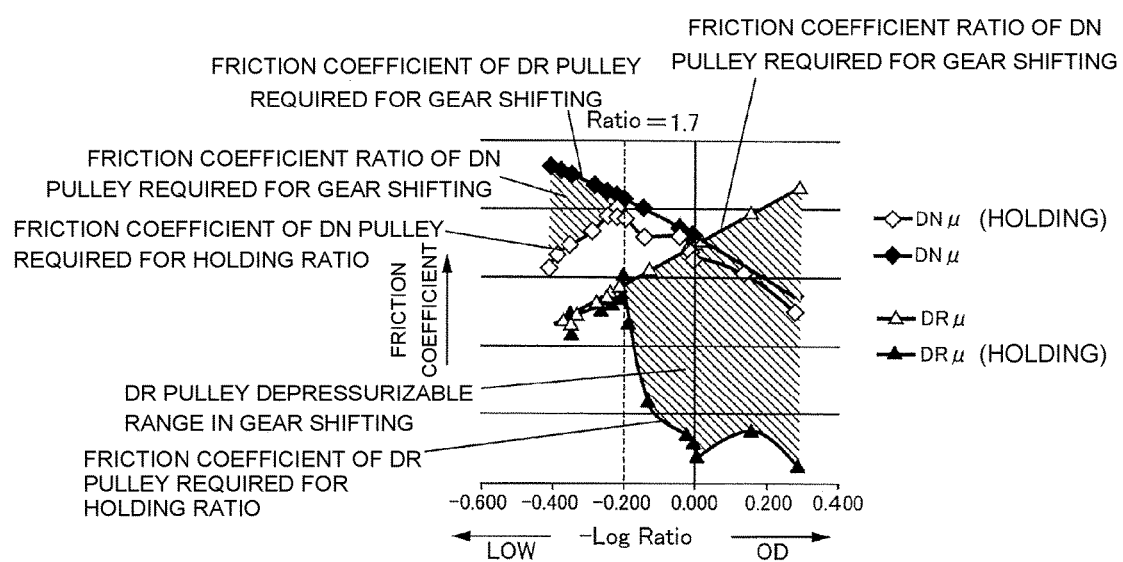
FIG. 5 is a graph obtained by synthesizing FIGS. 4A and 4B.

A graph of FIG. 5 is obtained by superimposing the graphs of (A) of FIG. 4 and (B) of FIG. 4. In conventional control, an extra axial thrust for holding the ratio was added to the driven pulley 14 in the region on the LOW side in relation to a state in which the ratio is about 1.7 (a state in which the −log ratio is about 0.2), and an extra axial thrust for holding the ratio was added to the drive pulley 13 in the region on the OD side in relation to the state. However, by the control of the embodiment, the extra axial thrust for holding the ratio is cut in the entire region excluding a position at which the ratio is about 1.7, and it is possible to increase the durability of the pulleys 13 and 14 and the metal belt 15 and to reduce the driving force of the hydraulic pump.

Figure 6:
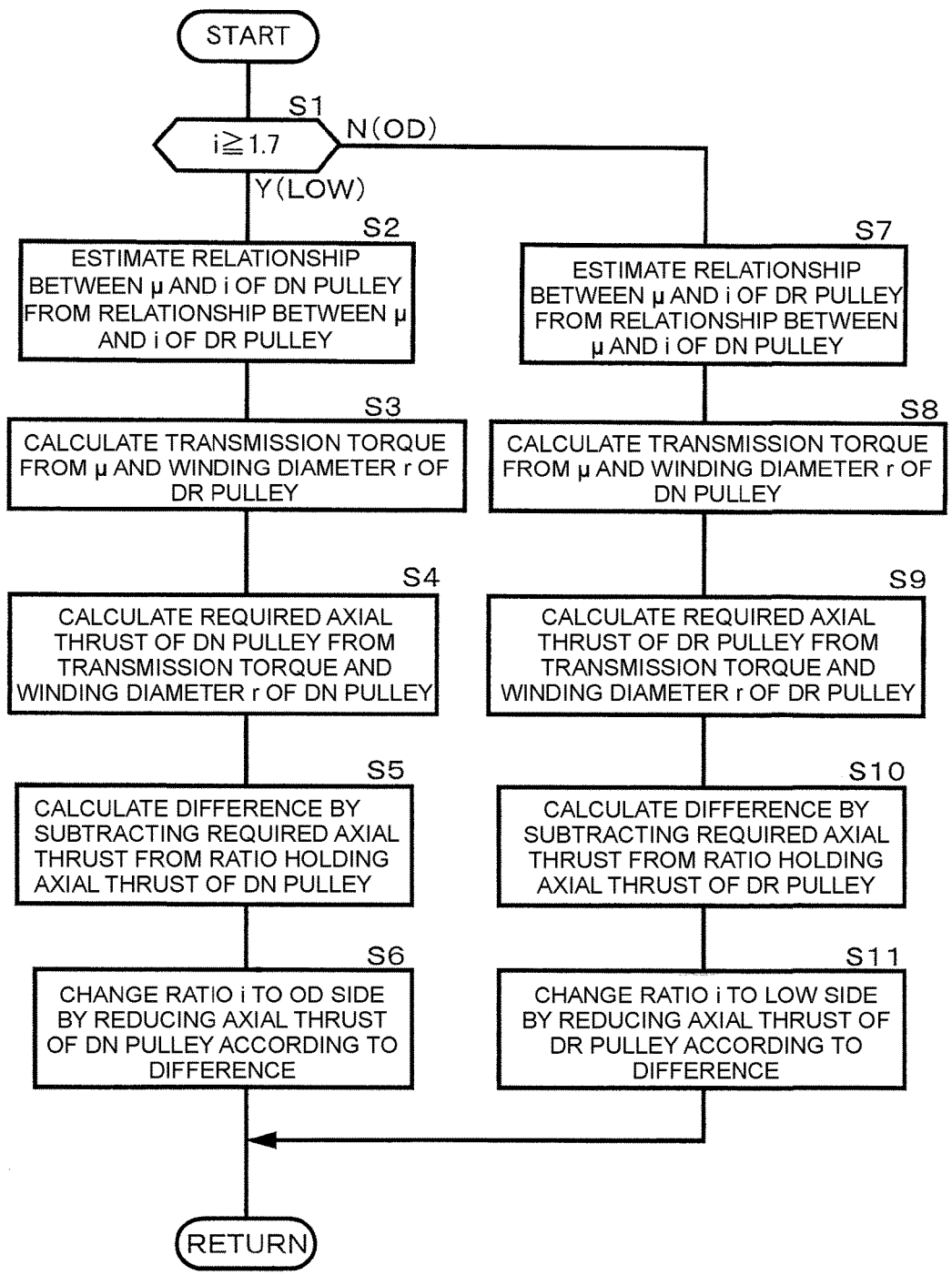
FIG. 6 is a flowchart illustrating a changing process of a ratio.

FIG. 6 is a flowchart illustrating the above-described transmission control process. First, in Step S1, an actual gear ratio i is compared with 1.7 which is a boundary gear ratio. The region on the LOW side in which the gear ratio i is 1.7 or more is a region in which the drive pulley 13 side of the drive pulley 13 and the driven pulley 14 slips first, the drive pulley 13 serves as a slippage side pulley, and the driven pulley 14 serves as a non-slippage side pulley. On the other hand, the region on the OD side in which the gear ratio i is less than 1.7 is a region in which the driven pulley 14 side of the drive pulley 13 and the driven pulley 14 slips first, the drive pulley 13 serves as the non-slippage side pulley, and the driven pulley 14 serves as the slippage side pulley.

In the region on the LOW side in which the gear ratio i is 1.7 or more, that is, in the region in which the drive pulley 13 is the non-slippage pulley and the driven pulley 14 is the slippage pulley, an unknown relationship between the tangential friction coefficient μ of the driven pulley 14 and the ratio i is estimated from the known relationship between the tangential friction coefficient μ of the drive pulley 13 and the ratio i in Step S2. Since the drive pulley 13 slips before the driven pulley 14 in the region on the LOW side in which the gear ratio i is 1.7 or more, the relationship between the tangential friction coefficient μ of the drive pulley 13 and the ratio i in the region on the LOW side in which the gear ratio i is 1.7 or more can be obtained in advance by experimentally slipping the drive pulley 13 at each ratio i and obtaining and storing the tangential friction coefficient μ between the drive pulley 13 and the metal belt 15 at that time. Additionally, the unknown relationship between the tangential friction coefficient μ of the driven pulley 14 and the ratio i in the region on the LOW side in which the gear ratio i is 1.7 or more is estimated on the basis of the above relationship (refer to FIG. 3).

In the following Step S3, the transmission torque of the drive pulley 13 is calculated by multiplying the tangential friction coefficient μ and the winding diameter r of the known drive pulley 13. When the metal belt 15 is not slipping, the transmission torque of the drive pulley 13 coincides with the transmission torque of the driven pulley 14.

In the following Step S4, the required axial thrust of the driven pulley 14 is calculated by dividing the transmission torque of the driven pulley 14 by the estimated tangential friction coefficient μ of the driven pulley 14. The required axial thrust of the driven pulley 14 corresponds to a minimum axial thrust necessary for the driven pulley 14 to transmit the torque without slipping.

In the following Step S5, the difference is calculated by subtracting the required axial thrust from the ratio holding axial thrust of the driven pulley 14. The ratio holding axial thrust of the driven pulley 14 is the axial thrust required for holding the ratio i, and it was conventionally set to be large with a sufficient margin with respect to the axial thrust required for preventing the slippage of the driven pulley 14.

In the following Step S6, the groove width of the driven pulley 14 is increased by reducing the ratio holding axial thrust applied to the driven pulley 14 within a range of the difference, and the ratio i is changed from the LOW side to the OD side.

On the other hand, in the region on the OD side in which the gear ratio i is less than 1.7 in Step S1, the ratio i is changed from the OD side to the LOW side by reducing the axial thrust of the drive pulley 13 in Steps S7 to S11. Steps S7 to S11 correspond to the above-mentioned Steps S2 to S6, respectively, and the content thereof is substantially the same except that the relationship between the drive pulley 13 and the driven pulley 14 is reversed.

Although the embodiment of the present invention has been described above, various design changes can be made without departing from the gist of the present invention.

What is claimed is:

1. A transmission control method of a belt type continuously variable transmission, in which a metal belt (15) is wound on a drive pulley (13) and a driven pulley (14) and a gear ratio is changed by changing axial thrusts of the drive pulley (13) and the driven pulley (14), comprising:
    a first process of estimating a relationship between a tangential friction coefficient and a ratio of a non-slippage side pulley according to a relationship between a tangential friction coefficient and a ratio of a slippage side pulley, wherein one of the drive pulley (13) and the driven pulley (14) is the non-slippage side pulley and another one of the drive pulley (13) and the driven pulley (14) is the slippage side pulley,
    a second process of calculating transmission torque transmitted by the metal belt (15) from the tangential friction coefficient and a winding diameter of the slippage side pulley,
    a third process of calculating a required axial thrust for suppressing slippage of the non-slippage side pulley from the transmission torque and the winding diameter of the non-slippage side pulley, and
    a fourth process of changing the gear ratio by reducing a ratio holding axial thrust of the non-slippage side pulley toward the required axial thrust.
2. The transmission control method according to claim 1, wherein, in a region in which the ratio is a predetermined value or more, reduction control of the axial thrust is performed in the driven pulley (14), and in a region in which the ratio is less than the predetermined value, the reduction control of the axial thrust is performed in the drive pulley (13).

* * * * *